(12) United States Patent
Castillo Rodriguez et al.

(10) Patent No.: US 8,821,954 B2
(45) Date of Patent: Sep. 2, 2014

(54) PROCESS FOR THE PRODUCTION OF REFINED WHOLE WHEAT FLOUR WITH LOW COLORATION

(75) Inventors: Francisco Bernardino Castillo Rodriguez, Col. Lomas de Chapultepec (MX); Gerardo Alberto Sanchez Olivares, Col. Lomas de Chapultepec (MX)

(73) Assignee: Bunge Commercial, S.A. de C.V., Mexico City ( * ) Notice: Subject to any disclaimer, the term of this patent is extended or adjusted under 35 U.S.C. 154(b) by 0 days.

(21) Appl. No.: 13/303,558

(22) Filed: Nov. 23, 2011

(65) Prior Publication Data
US 2012/0135128 A1 May 31, 2012

Related U.S. Application Data

(63) Continuation of application No. 12/003,072, filed on Dec. 19, 2007, now abandoned.

(30) Foreign Application Priority Data

Dec. 20, 2006 (MX) .................... MX/a/2007/000143

(51) Int. Cl.
*A21D 6/00* (2006.01)
*B02C 9/04* (2006.01)

(52) U.S. Cl.
USPC .............. 426/481; 426/548; 426/622; 241/10

(58) Field of Classification Search
USPC .............. 241/6, 9, 10, 11; 426/473, 622, 481, 426/548
See application file for complete search history.

(56) References Cited

U.S. PATENT DOCUMENTS

| 4,363,448 A | * | 12/1982 | Machler et al. ............... 241/10 |
| 4,710,386 A | | 12/1987 | Fulger et al. |
| 6,372,281 B1 | | 4/2002 | Metzger et al. |
| 7,101,580 B2 | | 9/2006 | Metzger |
| 2003/0108652 A1 | | 6/2003 | Monsalve-Gonzalez et al. |
| 2005/0136173 A1 | | 6/2005 | Korolchuk |
| 2005/0255219 A1 | | 11/2005 | Dreese et al. |
| 2006/0073254 A1 | | 4/2006 | Catani et al. |

FOREIGN PATENT DOCUMENTS

| JP | 2004147549 A | * | 5/2004 |
| JP | 2005168451 A | * | 6/2005 |

OTHER PUBLICATIONS

Definition of homogeneous, Oxford English Dictionary, 1989, available at http://www.oed.com/oed2/00107545; accessed on Nov. 17, 2012.*
Hunter Lab Brochure, Applications Note: "Insight on Color—Hunter L, a, b Color Scale," vol. 8, No. 9, Copyright 2008, 4 pages.
Oxford English Dictionary, Second Edition, Oxford University Press, 1989; available at http://www.oed.com/oed2/00047085; accessed on May 11, 2011.
USDA National Nutrient Database for Standard Reference Release 18, last updated Nov. 2005, available at http://www/nal.usda.gov/fnic/foodcomp/Data/SR18/sr18.html, accessed on Oct. 9, 2010.

* cited by examiner

*Primary Examiner* — Humera Sheikh
*Assistant Examiner* — W Moore
(74) *Attorney, Agent, or Firm* — Millen, White, Zelano & Branigan, P.C.

(57) ABSTRACT

A whitish whole-wheat flour and a process for producing the flour are described wherein the wheat bran is separated into a fine bran and a coarse bran fraction and the course bran is pulverized to a smaller size and mixed into the flour.

4 Claims, 2 Drawing Sheets

PROCESS FOR THE PRODUCTION OF REFINED WHOLE WHEAT FLOUR WITH LOW COLORATION

This application is a continuation of U.S. application Ser. No. 12/003,072, filed Dec. 19, 2007, now abandoned which is incorporated herein by reference and which claims priority of Mexican Patent Application No. MX/a/2007/000143, filed Dec. 20, 2006.

DESCRIPTION OF THE INVENTION

1. Scope of the Invention

This invention pertains to an improved whole-wheat flour and more particularly to a white whole-wheat flour and a process for producing it. According to the process of the invention, the entire wheat grain is used, thereby producing a whole-grain wheat flour.

2. Background to the Invention

Wheat is made up of three main anatomical components in a relative ratio; these components are endosperm (approximately 80.0%), bran (17.5%), and germ (2.5%).

In conventional wheat processing, the endosperm is the part that is separated in a conventional mill and is milled to very small sizes (approximately 95.0% to a size of less than 150 microns), i.e., it is the main component of the refined wheat flour. The bran is the part that covers the wheat grain and is the part of the wheat in which the fiber, vitamins, and minerals are concentrated. However, bran is generally considered a by-product from the production of refined wheat, and therefore this product is present in bulk and is very difficult to mill. Finally, the germ is the heart of the grain, and in it are concentrated the lipids of the grain, as well as goodly amounts of vitamins and minerals.

When wheat grains are milled, the endosperm is the main component of white wheat flour and is used to make bread since the bran is removed and is later used as animal feed. The germ is also removed because it has a high content of fat, which breaks down and therefore affects the bread's shelf life.

Although the endosperm in wheat makes up between 80% and 83% of the grain, milling provides yields of between 72% and 75% of white wheat flour, which is also referred to as refined flour. Thus, from 100 kilograms of wheat only 72-75 kilograms of white flour is obtained. This flour generally contains 1-4% dietary fiber, derived from small quantities of bran. The by-products of milling mainly include bran and germ, with a certain amount of endosperm.

Whole flours are obtained from milling the endosperm with the bran and the germ. Other so-called "whole" flours contain only a certain amount of bran. There are also certain whole flours that include a portion of the germ. According to the present invention, whole or whole-grain flour should be understood to mean flours that contain bran and germ and that comply with the standards that are applicable for being considered whole flours.

In general, the texture and taste of white flour ensure that they are more readily accepted on the market than whole flours; the latter, however, have greater nutrient value.

It is generally recommended that 50-60% of a person's diet consist of carbohydrates of plant origin. In a balanced diet, the majority of the foods are selected from among fruits, vegetables, and cereals (whole grain), which provide abundant sources of digestible and non-digestible carbohydrates, as well as vitamins and minerals. The non-digestible carbohydrates represent the dietary fiber. These fibers resist digestion in the human gastrointestinal tract. These fibers have a positive effect on the human hormone balance and reduce the level of estrogen in the blood, thereby reducing the risk of breast cancer. In addition, dietary fiber helps to eliminate toxins from the intestines. Bran contains a number of micronutrients, as well as dietary fiber, minerals, lipids, vitamins, and some substances known as "phytochemicals" that exert an anti-oxidant action on cellular metabolism.

Various attempts have been made to enhance the texture and improve the color of whole flours. For example, U.S. Pat. No. 7,101,580 describes a treatment for bleaching bran using peroxide.

Other techniques involve altering the composition of the whole flour by reducing the amount of bran. These flours cannot, however, be considered whole flours.

It should be mentioned that before 2002 there was no definition of the composition of a whole flour. Thus, flour manufacturers introduced the concepts of "whole grain flour" [in English] for identifying flours that had certain amounts of bran. Thus, many kinds of flour that were not really whole flours were labeled as such. However, in 2002 the U.S. Department of Agriculture (USDA, to use its English initials) issued Release 18 of the National Nutrient Database for Standard Reference, which defined the composition that a flour had to have to be considered whole flour. This standard sets forth the following composition:

| Nutrient | Unit | Value % |
| --- | --- | --- |
| Total fats (lipids) | g | 1.87 |
| Ash | g | 1.60 |
| Carbohydrates | g | 72.57 |
| Dietary fiber | g | 12.20 |
| Protein | g | 13.70 |
| Water | g | 10.27 |

U.S. Pat. No. 6,372,281 dated 16 Apr. 2002 describes a procedure for preparing a whole flour in which the bran fraction is subsequently milled and then mixed with the endosperm white-flour fraction. However, this procedure does not produce a whole flour as per USDA Release 18 of the National Nutrient Database for Standard Reference, because the germ portion is removed from said flour.

U.S. Patent Applications Nos. 2005/136173, 2005/136174, and 2006/0073254 describe a process for producing milled whole-grain flour. According to this process, the wheat grain is milled, and a fine fraction that basically consists of endosperm and a coarse fraction that includes bran, germ, and a small amount of endosperm are obtained. The coarse fraction is subsequently milled to a size of approximately 500 microns and is then mixed with the fine fraction. The processes described in the above-mentioned U.S. patents have various drawbacks: firstly, milling the bran along with the germ creates problems because these components of wheat have different mechanical properties. Thus, the wheat germ tends to release the fats that it contains and to make the resulting flour thicker. Moreover, the lipids contained in the germ tend to break down and to impart to the bread the rancid odor of stale bread. In addition, the texture and final color of the resulting product are still not satisfactory, especially because of the size of the bran particle, which is larger than 500 microns.

The technical problem that is addressed by this invention basically involves milling the bran, which can be homogenized with the refined flour and can be integrated with the germ so that a mixture can subsequently be produced in which the above-mentioned components are incorporated at the ratio prescribed by USDA Release 18 of the National Nutrient Database for Standard Reference. It is absolutely necessary that it be this mixture or one very close to it for it to be possible to say that it is WHOLE WHEAT as defined by the Standard. According to this invention, the composition of the whole flour includes endosperm (approximately 80%), bran (17.5%), and germ (2.5%).

SUMMARY OF THE INVENTION

This patent addresses the problem of producing a whole-wheat flour with organoleptic properties similar to those of white wheat flour, without reducing the bran content.

One of the goals of the invention is therefore to produce a whole flour that has the texture of refined flour.

Another goal of the invention is to provide a process that is an alternative to conventional wheat milling.

Yet another goal of the invention is to provide a system for processing the whole-wheat flour of this invention.

The above-mentioned goals are achieved by providing a refined whole-wheat flour that is produced by means of a process that consists in bringing all of the wheat's components down to a very small size (approximately 150 microns) to provide the texture of a refined flour; this is accomplished by adding a process that is an alternative to conventional milling.

According to this invention, a stream of whole-wheat flour is provided that basically consists of endosperm (80.0%), bran (17.5%), and germ (approx. 2.5%). The bran consists of a mixture of a stream of fine bran and a stream of pulverized bran.

Now, in order to carry out the milling of the component that is the most problematic, i.e., the bran, it is advantageous to use a high-speed hammer mill. This ingredient is diverted from its natural flow to be processed by this mill; once milled, it is sent to an in-line mixer where it joins the germ and the refined flour.

The mixing has to be carried out in line and in a very precise manner so as to avoid altering the ratio of ingredients that produces a flour in conformity with USDA Release 18 of the National Nutrient Database for Standard Reference; the equipment used to do the mixing contains very high-precision flow meters to allow only the exact amount needed of each ingredient to pass in order to carry out the remixing and finally to produce the flour of the invention. The composition of the whole-grain flour of this invention is approximately 80.0% endosperm, approximately 17.5% bran, and approximately 2.5% germ.

DESCRIPTION OF THE FIGURES

FIG. 1 key:
20—Supplying of wheat
25—Fractionation of wheat grain
28—Separation of endosperm, germ, and bran
43—Compression
45—Refined wheat flour
47—Flow control
51—Heat treatment
55—Wheat germ
57—Flow control
60—Bran separation
65—Fine wheat bran
67—Flow control
71—Coarse wheat bran
73—Particle size reduction
75—Pulverized wheat bran
77—Flow control
90—Refined whole-wheat flour
  Sacking silo
100—Sacking

FIG. 2 key:
20—Supplying of wheat
25—Fractionation of wheat grain
28—Separation of endosperm, germ, and bran
43—Compression
45—Refined wheat flour
47—Flow control
51—Heat treatment
55—Wheat germ
57—Flow control
60—Bran separation
65—Fine wheat bran
71—Coarse wheat bran
73—Particle size reduction
75—Pulverized wheat bran
77—Flow control
90—Refined whole-wheat flour
  Sacking silo
100—Sacking In accordance with the process of this invention, the following steps are included:
1. Conditioning of the wheat grain;
2. Fractionation of the wheat grain;
3. Separation and distribution of the endosperm, bran, and germ;
4. Milling of the endosperm;
5. Treatment of the germ;
6. Treatment of the bran, which includes:
    6.1. Separation of the fine bran;
    6.2. Pulverization of the coarse bran;
7. Mixing;
8. Sacking and labeling;
9. Storage of the final product.

Figure 1:
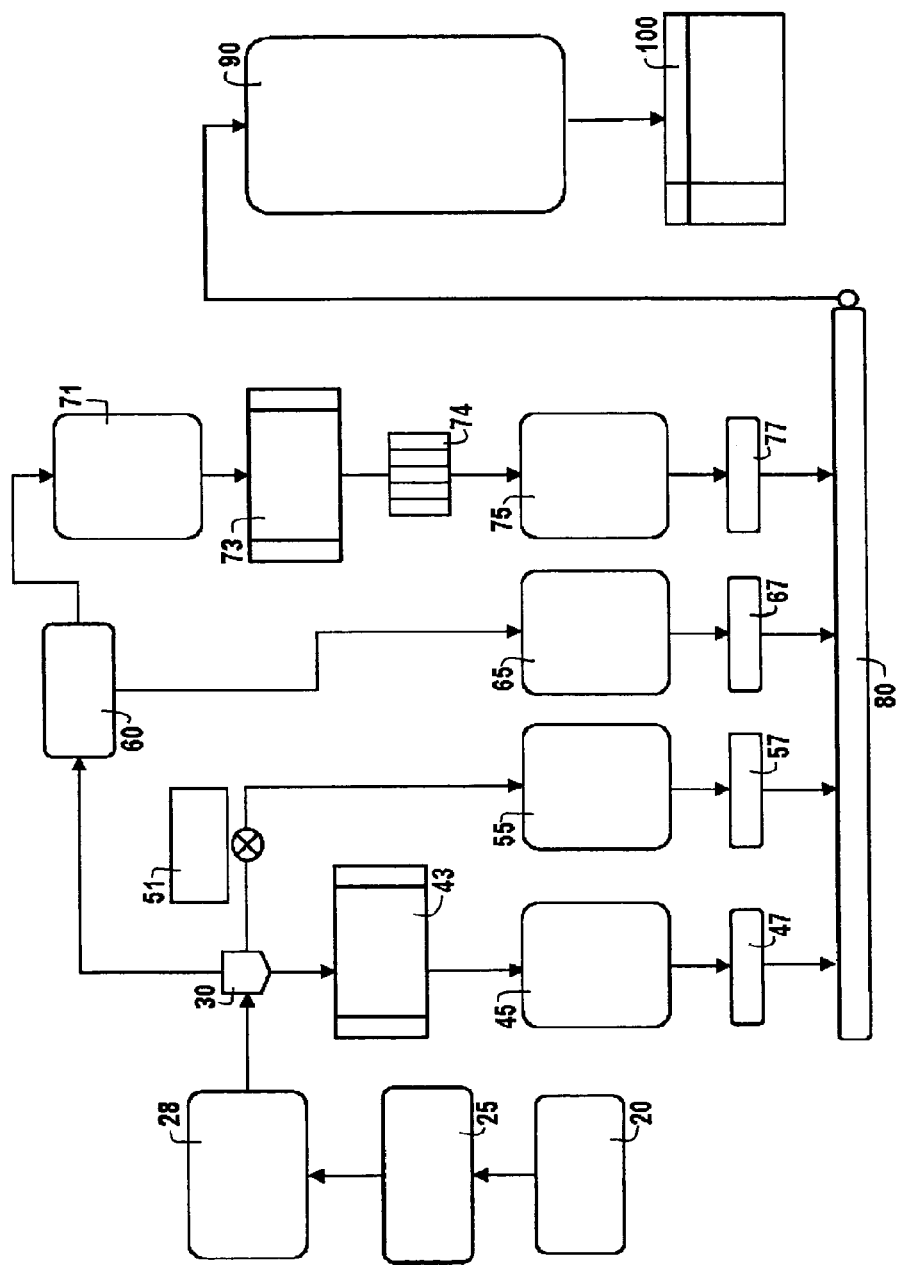
FIG. 1 shows a diagram of the process according to this invention.

Below the steps are described with reference to the Figures.

1. Conditioning of the Wheat Grain

Wheat conditioning 20 consists in supplying grains of wheat under conditions that are suitable for milling. A variety of techniques are known in the state of the art. Conditioning includes a step where the wheat is cleaned in order to remove stones and sand mixed in with the wheat; sieve separators are generally used for this purpose. A certain amount of moisture is then added to the grain in order to harden the bran and make it easier to separate during milling.

2. Fractionation of the Wheat Grain

The conditioned whole-wheat grain is fed to a number of titration banks 25 to be fractionated. This fractionation produces fine particles that basically consist of endosperm and coarse particles that are composed mainly of germ and bran.

3. Separation and Distribution of the Endosperm, Bran, and Germ

The separation 28 of the coarse and fine milled particles of endosperm, bran, and germ is done using separation equipment, e.g., one or more sifters, thereby producing a stream of refined flour (endosperm) with a very fine grain size range (150-180 microns), a stream of bran in wider openings in different grain size ranges, and a stream of germ in the form of small flakes, with a particle size of approximately 700-850 microns.

The streams of bran, germ, and endosperm that are separated at step 28 are distributed at step 30 in order to process each component. To do so, a control valve is used that is operationally connected to the sifter(s) in order to feed the streams to the different component treatment steps in the necessary quantities as directed by the pulverization system controller.

4. Endosperm Compression

The endosperm is delivered to a subsequent compression step 43 to standardize the particle size at around 150-180 microns, where the particles are collected in a refined-flour container 45.

5. Treatment of the Germ

The germ is delivered to a step 51 to be heat-treated in a heat-treatment unit in order for the lipids or fats contained in the germ to be deactivated so as to reduce the reactivity of the lipids contained in the germ. This ensures that the final product that is produced with the wheat flour of this invention has an improved shelf life.

The purpose of the heat treatment is to prevent the lipid oxidation reactions that lead to the formation of volatile and non-volatile chemicals that impart odors and tastes (peroxides, aldehydes, alcohols, and ketones) that are characteristic of rancidity. These reactions are promoted by enzymes that are present in the bran; the heat treatment deactivates or destroys these lipolytic enzymes.

According to this invention, the wheat germ has a particle diameter of approximately 750-850 microns and does not require an additional milling step. An additional milling step can, however, be included in order to homogenize the germ particle size. Finally, the germ is collected in the wheat germ container 57.

6. Treatment of the Bran

According to this invention, the treatment of the bran consists of a bran separation step for producing a stream of fine bran particles and a stream of coarse bran particles, plus a step where the coarse bran particles are milled, optionally followed by reintegration of the two.

6.1. Separation of the Fine Bran

The bran that is obtained from the grain fractionation step 25 has a particle diameter distribution of between 200 and 2000 microns. The bran that is separated at step 28 is distributed by step 30 to a bran separation step 60. The purpose of the bran separation step is to separate the fine bran particles measuring around 200 microns. The fine particles are sent to a fine bran container 65. The remaining particles (coarse bran particles) are sent to a size-reduction or pulverization step.

6.2. Pulverization of the Coarse Bran

The portion of coarse bran that is produced in bran separation step 60 is stored in a container 71 and is then subjected to a pulverization process 73. The purpose of this pulverization step is to ensure a mean particle size of approximately 180 microns. The pulverized bran is then sent through a filter 74, preferably a sleeve filter, to a pulverized bran container 75.

7. Metering, Mixing, and Shipping of the Components

According to the process of this invention, the following are obtained:

a) endosperm, with a particle diameter of approximately 150-180 microns, whereby the particles are contained in container 45;
b) germ, with a particle diameter of approximately 700-850 microns, whereby the particles are contained in container 55;
c) fine bran, with a particle diameter of approximately 200 microns, whereby the particles are contained in container 65, and
d) pulverized bran, with a particle diameter of approximately 180 microns, whereby the particles are contained in container 75.

These components are then mixed to produce the flour as per USDA Release 18 of the National Nutrient Database for Standard Reference.

To accomplish this, the above-mentioned components, endosperm 45, bran 65, 75 and germ 55 are prepared in hoppers before they are mixed.

First, the streams of bran, germ, and endosperm pass through high-precision flow meters. As in FIG. 1, the meters 47, 57, 67, and 77 for endosperm, germ, fine bran, and pulverized bran, respectively, are shown whose purpose is to ensure the ideal relative ratio of these components, and the components then are sent to the mixer 80 to be mixed.

Figure 2:
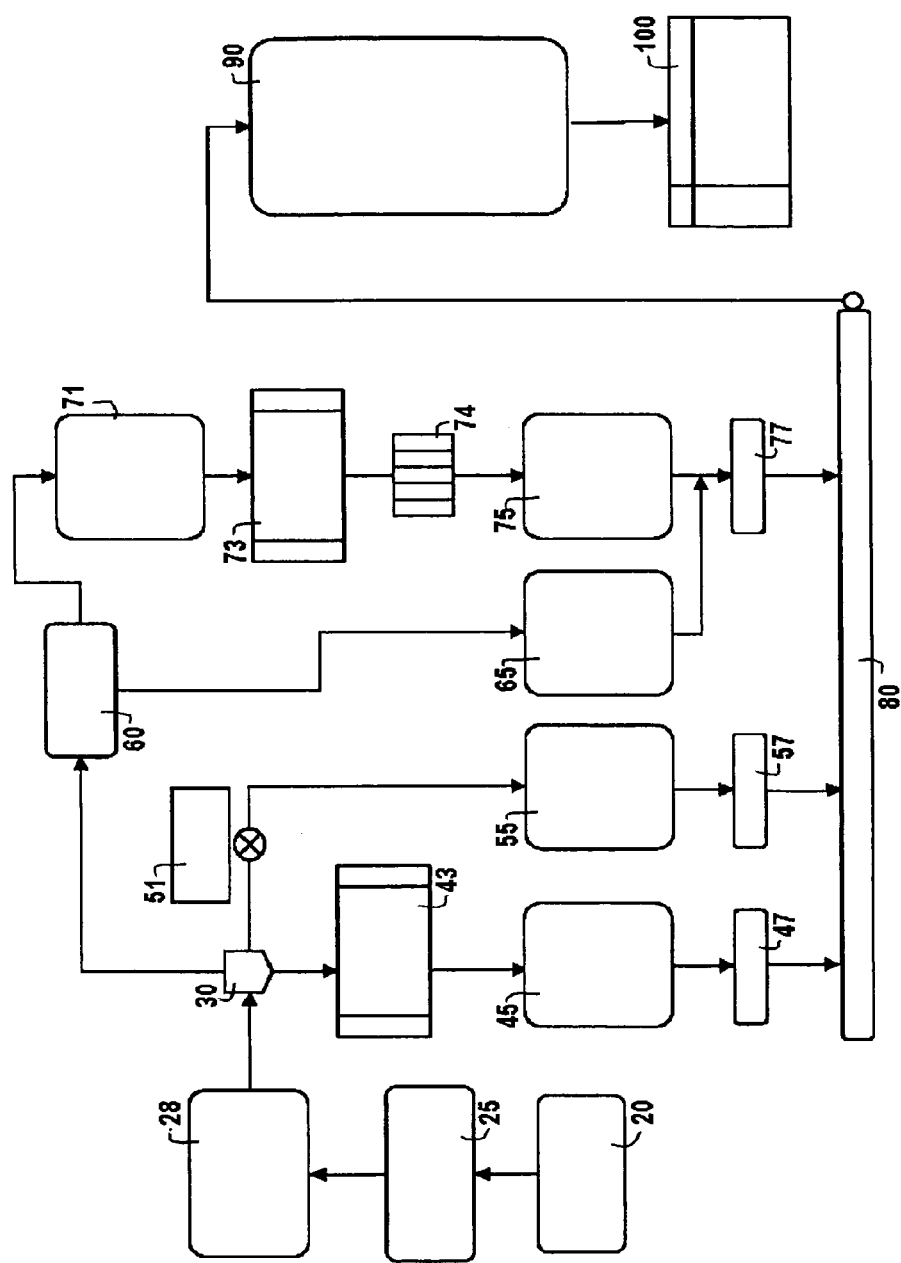
FIG. 2 shows a variant of the process of the invention.

In accordance with the scheme of the invention illustrated in FIG. 2, the fine-bran and pulverized-bran lines can be combined to form a single bran component with a particle size of 80-200 microns, so that only a single flow controller 77 is used.

According to this invention, the composition of the nutrients of the flour as per USDA Release 18 of the National Nutrient Database for Standard Reference is achieved by combining approximately 80.0% endosperm, approximately 17.5% bran, and approximately 2.5% germ.

The controller is linked to a control center and is connected to controllers 47, 57, 67, and/or 77 by means of remote or wireless communication. The control center can be operated manually or can automatically make the partial volume adjustments needed to produce the required formulation.

The above-mentioned milled products arrive at the mixer, where they are incorporated in a ratio that is suitable for being homogenized and for producing the final product. The mixer is preferably an in-line mixer.

The endosperm supplies the carbohydrate component, the bran supplies most of the dietary fiber and ash (or minerals), while the germ supplies the bulk of the proteins and vitamins. The proportion of each component depends on the variety and size of the wheat used, while the total quantities of endosperm, germ, fine bran, and pulverized bran are variable, but, owing to the flow controllers 47, 57, 67, and 77, the composition of the resulting flour is always the same, i.e., approximately 80.0% endosperm, approximately 17.5% bran, and approximately 2.5% germ; this is the same as the natural composition of wheat grain.

Thus, this invention makes it possible to ensure the continuous production of whole-wheat flour with a uniform composition, regardless of the portions of wheat used and the variations in the amounts of endosperm, germ, and bran in the grains that are used.

According to the FDA Code of Federal Regulations, in order for a flour to be considered "refined", at least 90% of the flour must pass through a US std 70 mesh (212 microns). The flour of this invention complies with this standard.

According to this invention, every grain of wheat is used, and product wastage is minimal. However, as will be obvious to one skilled in the art, it is possible to add endosperm, germ, fine bran, and pulverized bran from a different source when the grain that is used does not provide the quantities needed to achieve the ratio of components established by USDA Release 18 of the National Nutrient Database for Standard Reference.

8. Sacking and Labeling

The product is optionally but preferably stored and packaged using conventional packaging equipment 90. Preferably, 25-kg two-ply polyethylene-lined Kraft-paper sacks are used. Likewise, a label is optionally but preferably affixed to the sack with this equipment. The label preferably indicates the production lot, bar code, and expiration date.

9. Storage and Distribution

In the last optional but preferred step, the final product is stored in conventional warehousing 100 from where it is distributed for consumption.

The whole-wheat flour of this invention contains 71.00-73.00% carbohydrates, 1.50-2.50% fat, 1.40-1.60% ash, 11.60-12.20% fiber, 10.0-13.0% moisture, and 13.0-14.0% protein, so that it fully complies with USDA Release 18 of the National Nutrient Database for Standard Reference and therefore constitutes a whole-grain or whole flour.

To obtain a low color tone in the flour, it is necessary to work with a variety of white flour since it has little coloration compared to typical red wheats.

The color of the whole-grain flour of this invention is defined in terms of its luminosity (L), reds (a+), and yellows (b+), as indicated by the following table:

| L | a+ | b+ |
|---|---|---|
| 84-86 | 1-1.5 | 21-23 |

It is accepted that a white flour has a luminosity value L of 90-92, a+ values of 0.5-1.0, and b+ values of 10-12.

The whole flour of the invention combines the nutritional benefits of whole grain with the process and quality benefits of products made with refined white flour. The applicant has developed a revolutionary white whole flour that offers the best of both worlds, taste, texture, and nutrition. Using an exclusive milling process, we process a variety of white wheat that makes it possible to produce a flour that retains a light taste, as well as the color and texture of conventional refined flour. Likewise, the flour of the invention retains the nutritional advantages of a whole flour: a higher concentration of phytonutrients, a lower concentration of starch, and four-five times higher levels of nutrients, including minerals, B complex vitamins, and dietary fiber than those found in refined flours.

According to the process of the invention, it is possible to produce one soft-wheat flour and another flour with hard wheat; this allows us to use the flour in baked products such as bread, pasta, pizza dough, tortillas, cereal, biscuits, cakes, cocktail canapés, waffles, etc.

The benefits of this flour include:
Preventing colon cancer;
Preventing cardiovascular problems;
Reducing the glycemic index;
Promoting weight loss;
Regulating metabolism.

The following table shows the nutritional value of the flour of the invention.

| Nutritional Information | | Amount per Ration | |
|---|---|---|---|
| Energy Content | 334 kcal | Size of Ration: | 100 mg |
| Total fat: | 1.95 g | Total folates: | 42.0 mg |
| Consisting of: | | Folic acid: | 0.00 mg |
| Saturated fat: | 0.332 g | Niacin (vitamin B3): | 6.5 mg |
| Mono-unsaturated fat: | 0.243 g | Vitamin B1: | 0.42 mg |
| Poly-unsaturated fat: | 0.781 g | Vitamin B2: | 0.19 mg |
| Cholesterol | 0.00 mg | Iron | 3.76 mg |
| Sodium: | 5.0 mg | Vitamin E: | 0.78 mg |
| Carbohydrates: | 70.5 g | Zinc: | 2.871 mg |
| Including: | | Calcium: | 33 mg |
| Dietary fiber: | 11.6 g | Vitamin B6: | 0.32 mg |
| Protein: | 13.0 g | | |

The entire disclosure of all applications, patents and publications, cited above are hereby incorporated by reference in their entirety, including Mexican priority application MX/a/2007/000143, filed on Dec. 20, 2006.

Without further elaboration, it is believed that one skilled in the art can, using the preceding description, utilize the present invention to its fullest extent. Various modifications will be obvious to one skilled in the art; said modifications should be considered to be included within the scope of the protection contained in the following claims.

What is claimed is:

1. A method for obtaining a refined whole-wheat flour, which comprises the steps of:
   (a) supplying a quantity of wheat grain suitable for milling;
   (b) fractionating the wheat grain to obtain endosperm, bran, and germ;
   (c) separating and distributing the endosperm, bran, and germ;
   (d) milling the endosperm that is obtained in step (c) to obtain a particle size of approximately 150-180 microns;
   (e) treating the germ to reduce the reactivity of lipolytic enzymes which act on lipids contained therein;
   (f) treating the bran obtained in step (c) by:
      (i) separating the stream of bran coming from step (c) in order to produce a fine bran and a coarse bran, and
      (ii) milling the coarse bran from step (i) in order to obtain a pulverized bran with a particle diameter of approximately 180 microns;
   (g) mixing the endosperm from step (d), the germ from step (e), the fine bran from step (f-i), and the pulverized bran from step (f-ii) in order to obtain a whole-wheat flour that consists of approximately 80.0% endosperm, approximately 17.5% bran, and approximately 2.5% germ and wherein said refined whole-wheat flour has L value on the Hunter scale, Illuminant D65, of 84-86.

2. A method in accordance with claim 1, wherein the wheat grain that is supplied consists of white wheat.

3. The method in accordance with claim 1, wherein mixing the endosperm from step (d), the germ from step (e), the fine bran from step (f-i), and the pulverized bran from step (f-ii) to obtain a whole-wheat flour is performed in an in-line mixer wherein the endosperm, the germ, the fine bran, and the pulverized bran are run through individual high-precision flow meters, whereby these flow meters are operationally connected to a flow controller, before the ingredients are mixed in an in-line mixer.

4. The method in accordance with claim 1, wherein the fine bran and pulverized bran are combined to form a single stream of bran before reaching the mixing step.

* * * * *